United States Patent [19]

Chen

[11] Patent Number: 4,605,837

[45] Date of Patent: Aug. 12, 1986

[54] ELECTRIC AIR PREHEATER FOR AN INTERNAL COMBUSTION ENGINE

[76] Inventor: Lih-Ji Chen, No. 34, I-Hsin Third Street, Tai-Pin Hsiang, Taichung, Taiwan

[21] Appl. No.: 637,903

[22] Filed: Aug. 6, 1984

[51] Int. Cl.⁴ .................... H05B 3/00; F02M 31/12; F24H 3/00

[52] U.S. Cl. .................... 219/206; 123/549; 123/556; 219/374; 219/381; 261/142

[58] Field of Search ............... 219/205–207, 219/381, 382, 374, 280–282; 261/142; 123/549, 556, 557, 142.5 R, 142.5 E

[56] References Cited

U.S. PATENT DOCUMENTS

| | | | |
|---|---|---|---|
| 922,531 | 5/1909 | Siebert | 219/381 |
| 946,239 | 1/1910 | Low et al. | 123/549 |
| 1,155,599 | 10/1915 | Metcalf | 123/549 |
| 1,221,536 | 4/1917 | Hopkins | 123/556 |
| 1,272,433 | 7/1918 | Harrod | 219/207 X |
| 1,333,558 | 3/1920 | Minor | 219/206 |
| 1,370,459 | 3/1921 | Lippoldt | 123/556 |
| 1,499,586 | 7/1924 | Marce | 219/381 X |
| 2,368,180 | 1/1945 | Van Dietz | 219/207 |
| 3,423,569 | 1/1969 | Cappell et al. | 123/549 X |
| 3,787,037 | 1/1974 | Motooka | 123/556 X |

FOREIGN PATENT DOCUMENTS 538703 11/1931 Fed. Rep. of Germany ...... 261/142

*Primary Examiner*—A. Bartis
*Attorney, Agent, or Firm*—Charles E. Pfund

[57] ABSTRACT

A preheater for heating air to be mixed with the fuel-air mixture for an internal combustion engine for ease of combustion in cold weather includes a hollow cylindrical casing defining a heating chamber in which is positioned a cylindrical rod-shaped electric resistance heating element. A cover at one end of the casing supports the heating element and is provided with a cold air inlet. A heated air outlet from the heating chamber is provided on a cover closing the other end of the casing and communicates with a valve body having a flow passage provided with an adjustable spring-biased check valve arranged to prevent flow in the direction toward heating chamber. An adjustable needle valve is provided in the flow passage intermediate the heated air outlet and the check valve for regulating the flow rate of heated air therethrough.

7 Claims, 2 Drawing Figures

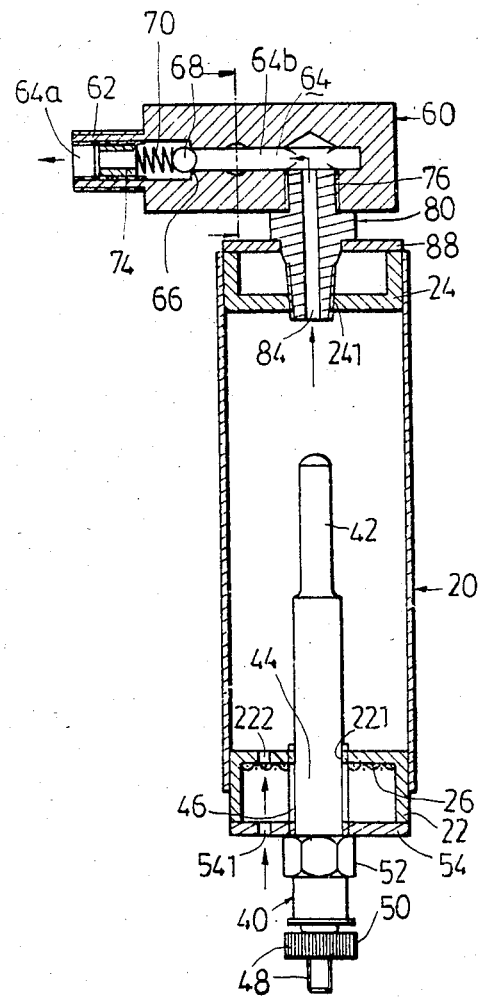
F I G. 1
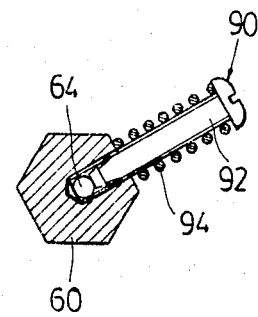
F I G. 2

ELECTRIC AIR PREHEATER FOR AN INTERNAL COMBUSTION ENGINE

BACKGROUND OF THE INVENTION

This invention relates to a heating device, particularly to a preheater for heating air which in turn is to be mixed with the fuel-air mixture for the ease of combustion in a cold weather.

It is known in the art to preheat the air before entering into the engine so that a warm fuel-air mixture can be rendered for ease of combustion. In one form of the preheater, the air is preheated by the heat of the exhaust. In another form of the preheter, the air is heated by the heat of the engine body. However, it is found that both are deficient since they can only heat the air after the engine operates. If the engine is required to start in a very cold weather, the above preheaters are of no use.

SUMMARY OF THE INVENTION

An object of the invention is to provide a preheater to heat the air which in turn heats the fuel-air mixture by being mixed together in the engine, thereby rendering the fuel to volatilize completely and the mixture to burn more easily and more completely.

Another object of the invention is to provide a preheater to heat the air before the engine is started, thereby eliminating the above described disadvantages.

The foregoing and other objects can be achieved in accordance with the present invention through the provision of a preheater which comprises a cylindrical casing having its two ends provided with two covers respectively, an electric heating unit mounted to one of said cover and extending into the casing, and a valve body mounted the other said cover for regulating the flow of the heated air to the engine.

In one aspect of the invention, the preheater may further comprises a needle valve for regulating the air flow in the valve body.

In another aspect of the invention, the valve body may include a valve ball which can allow the air to flow only in one direction.

In further aspect of the invention, the valve body may include a passage having a larger cross section portion, a smaller cross section portion and a shoulder formation between said larger and smaller cross section portions, and a spring loaded valve ball normally biassed to abut against said shoulder.

The presently exemplary preferred embodiment will be described in detail with reference to the accompanying drawings.

BRIEF DESCRIPTION OF THE DRAWING

FIG. 1 is a sectioned view of a preheater in accordance with the present invention; and FIG. 2 is a sectioned view of the valve body taken along the line 2—2 of FIG. 1.

DETAILED DESCRIPTION OF THE PREFERRED EMBODIMENT

Referring to FIG. 1, there is shown a preheater which includes a hollow cylindrical casing 20, a heating unit 40 and a valve body 60. The hollow cylindrical casing is provided with two covers 22 and 24 which are press fitted to two ends of the casing 20. The covers 22 and 24 are respectively provided with threaded holes 221 and 241. An air inlet hole 222 is provided at the cover 22 of which one side is further provided with an air filter 26.

The heating unit 40 includes an upper portion which is an excellent resistance element 42, such as made of a nickel chromiun alloy. The intermediate portion 44 is provided with male thread formation 46, and the lower end portion is a screw rod 48. A knob 50 is further provided in a rotatable position with respect to the screw rod 48. By means of the knob 50 and the screw rod 48 an electric wire (not shown) from a power source can be attached to the heater 40. There is further provided a hexagonal nut 52 between the intermediate portion 44 and the screw rod 48. The thread formation 46 of the intermediate portion 44 is threadedly passed through the threaded hole 221 and the heating unit 40 is locked against movement by using an annular plate 54 and turning the nut 52 against the plate 54. The annular plate 54 is also provided with an air inlet hole 541.

The valve body 60 can be of any shape, such as, circular, rectangular or polygonal shape, in its crosssection and in this embodiment it is preferably a hexagonal shape in its cross section. The body 60 has a small diameter portion 62 having male threads 62a provided thereon. There is further provided a blind channel 64 having a larger cross section portion 64a and a shoulder 66 and a smaller cross section portion 64b. A ball 68 is located in the larger cross section portion 64a in which is further provided a spring 70 biassing the ball 68 against the shoulder 66, thereby blocking the smaller cross section portion 64b. The biassing force of the spring 70 can be adjusted by means of a hollow plug member 74 which is threadedly inserted in the larger cross section portion 64a.

There is further provided a threaded hole 76 which is communicated with the smaller cross section 64b. In the threaded hole 76 is inserted a portion of an adaptor 80 which has a passage 84 in communication with the smaller cross section 64b. The lower end of the adaptor 80 is screwed into the cover 24 of the casing 20 and is locked against movement by using an annular plate 88.

Referring to FIG. 2, there is further provided a needle valve 90 which includes a screw 92 and a spring 94 sleeved onto the screw 92. The screw 92 has a conical portion and is threaded into a radial opening 63 entering into the hexagonal body 60, along the line perpendicular to the longitudinal axis of the body 60, until it reaches the blind channel channel 64. The needle valve 90 is provided for regulating the flow of the air through the channel 64. It is specifically designed to match with the desired engine.

In operation, the casing 20 of the device is grounded by being connected to and communicated with the air-fuel mixture inlet of the engine between the engine and the carburetor. The screw rod 48 is electrically connected to the positive terminal of the battery through a switch (not shown). When the engine is to be operated during the cold weather, an electric power is supplied to the heating unit 40. The surrounding cold air which passes through the air inlet 541 and 222 is heated in the cylindrical casing 20. When the engine is started, the suction stroke of the engine suctions the fuel-air mixture from the carburetor and at the same time causes the ball 68 to move apart from the shoulder so that the hot air from the casing 20 is drawn into the air-fuel mixture inlet and mixed with the air-fuel mixture from the carburetor. Due to the presence of the preheater of the invention, the air-fuel mixture is heated by the preheated air, thereby rendering the combustion more easy and also increasing the efficiency of the combustion. In addition, the provision of a preheater also reduces the fuel consumption. After the combustion is started, the air need not be heated by the preheater 40 and therefore the preheater 40 can be cut off from the battery.

It can be appreciated that, when the engine fires, the pressure generated will cause the ball 68 to abut against the shoulder 66, thereby preventing the reverse flow of the combustion gases into the casing 20.

With the invention thus explained, it is apparent that obvious modifications and variations can be made without departing from the scope of the invention. It is therefore intended that the invention be limited as indicated in the appended claims.

I claim:

1. A preheater adapted to be connected to an internal combustion engine comprising a hollow cylinder, a cover element at each end of the hollow cylinder, said hollow cylinder and cover elements collectively defining an elongate closed heating chamber, an elongate electric heating element in the form of a cylindrical rod supported by the cover element at one end of the hollow cylinder in coaxial relation with the longitudinal axis of the hollow cylinder such as to define with the wall of said cylinder an annular space surrounding the heating element, said cover element at said one end containing an opening defining an air inlet passage into said annular space within said heating chamber, a valve body defining a flow passage closed at one end and open at the other, a coupling element connecting the valve body to the cover element at the other end of the hollow cylinder and embodying a flow passage in communication at one end with the annular space within said heating chamber and at the other end with the flow passage in the valve body intermediate the ends of the valve body flow passage and a spring-biased check valve element located in the flow passage in the valve body adjacent the open end, said spring-biased valve element being biased in a direction to permit flow from the heating chamber through the flow passage in the valve body in the direction of the open end and to prevent flow in a direction from the open end toward the closed end.

2. A preheater according to claim 1 comprising an adjustable needle valve located in the flow passage of the valve body intermediate the open and closed ends ends thereof and downstream of the connection between the flow passage of the valve body and the flow passage of the coupling element for regulating the flow of air through the flow passage of the valve body.

3. A preheater according to claim 2 wherein the valve body contains a radially-disposed threaded opening, the inner end of which is in communication with the flow passage therein, the needle valve is threaded into said radially-disposed opening with its inner end extending into said flow passage and its outer end extending radially outward from the valve body and is provided with a head and a coil spring is disposed about the needle valve with its opposite ends engaged, respectively, with the valve body and the head.

4. A preheater according to claim 1 wherein said flow passage in the valve body is defined by adjoining coaxial passages of different diameter providing at their junction an annular valve seat facing the open end of the flow passage and the spring-biased valve element is spring-biased against said annular valve seat.

5. A preheater according to claim 1 wherein the heating element is comprised of nickel chromium alloy.

6. A preheater according to claim 5 wherein a threaded sleeve is threaded into the open end of the flow passage in the valve body and the spring of said spring-biased check valve element is disposed in the flow passage between the inner end of the sleeve and the valve element for biasing the latter against the seat and said sleeve is adjustable to vary the resistance of the valve element to displacement.

7. A preheater according to claim 1 wherein the heating element has a threaded portion, the cover at the one end has a threaded opening for receiving the threaded portion of a heating element and a nut is provided for locking the heating element in fixed relation to said cover.

* * * * *